(12) United States Patent
Niu et al.

(10) Patent No.: US 6,625,157 B2
(45) Date of Patent: *Sep. 23, 2003

(54) APPARATUS AND METHOD IN A NETWORK SWITCH PORT FOR TRANSFERRING DATA BETWEEN BUFFER MEMORY AND TRANSMIT AND RECEIVE STATE MACHINES ACCORDING TO A PRESCRIBED INTERFACE PROTOCOL

(75) Inventors: Autumn Jane Niu, Sunnyvale, CA (US); Jenny Liu Fischer, Mountain View, CA (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/314,977

(22) Filed: May 20, 1999

(65) Prior Publication Data

US 2003/0072316 A1 Apr. 17, 2003

(51) Int. Cl.[7] .............................................. H04L 12/28
(52) U.S. Cl. ............................. 370/395.71; 370/395.7; 370/395.72; 370/389; 370/390; 370/396; 370/397; 709/104; 709/215; 709/216; 710/22; 710/23; 710/112
(58) Field of Search ................................ 370/390, 389, 370/396, 397, 398, 400, 412–414, 395.7, 395.71, 395.72; 709/104, 108, 208–216, 220; 711/22–23

(56) References Cited

U.S. PATENT DOCUMENTS

| | | | |
|---|---|---|---|
| 4,845,710 A | * 7/1989 | Nakamura et al. | .......... 370/360 |
| 5,515,376 A | 5/1996 | Murthy et al. | |
| 5,768,257 A | * 6/1998 | Khacherian et al. | ........ 370/229 |
| 5,916,309 A | * 6/1999 | Brown et al. | .............. 348/116 |
| 6,046,817 A | * 4/2000 | Brown et al. | .............. 358/1.15 |
| 6,067,408 A | * 5/2000 | Runaldue et al. | ........... 710/307 |
| 6,161,160 A | * 12/2000 | Niu et al. | ................... 709/213 |
| 6,233,242 B1 | * 5/2001 | Mayer et al. | ................ 370/392 |
| 6,317,427 B1 | * 11/2001 | Augusta et al. | ............. 370/357 |
| 6,320,864 B1 | * 11/2001 | Hebb et al. | ................. 370/412 |
| 6,330,591 B1 | * 12/2001 | Ducaroir et al. | ............ 709/213 |
| 6,335,935 B2 | * 1/2002 | Kadambi et al. | ........... 370/389 |

OTHER PUBLICATIONS

Harry Newton, Newton's Telecom Dictionary, 1996, Flatiron Publishing, Inc., 10th Edition, p. 910.*

* cited by examiner

Primary Examiner—Kenneth Vanderpuye
Assistant Examiner—Van Kim T. Nguyen

(57) ABSTRACT

A network switch in a packet switched network includes a plurality of network switch ports, each configured for sending and receiving data packets between a medium interface and the network switch. The network switch port includes an IEEE 802.3 compliant transmit state machine and receive state machine configured for transmitting and receiving network data to and from a medium interface, such as a reduced medium independent interface, respectively. The network switch port also includes a memory management unit configured for selectively transferring the network data between the transmit and receive state machines and a random access transmit buffer and a random access receive buffer, respectively. The memory management unit transfers the network data between the transmit and receive state machines and the respective buffers based on prescribed interface protocol signals between the memory management unit and the transmit and receive state machines. Hence, the memory management unit and the transmit and receive state machines transfer data according to a prescribed interface protocol, where a request-based protocol enables data transfers to be performed independent of different clock domains encountered within the network switch port.

23 Claims, 8 Drawing Sheets

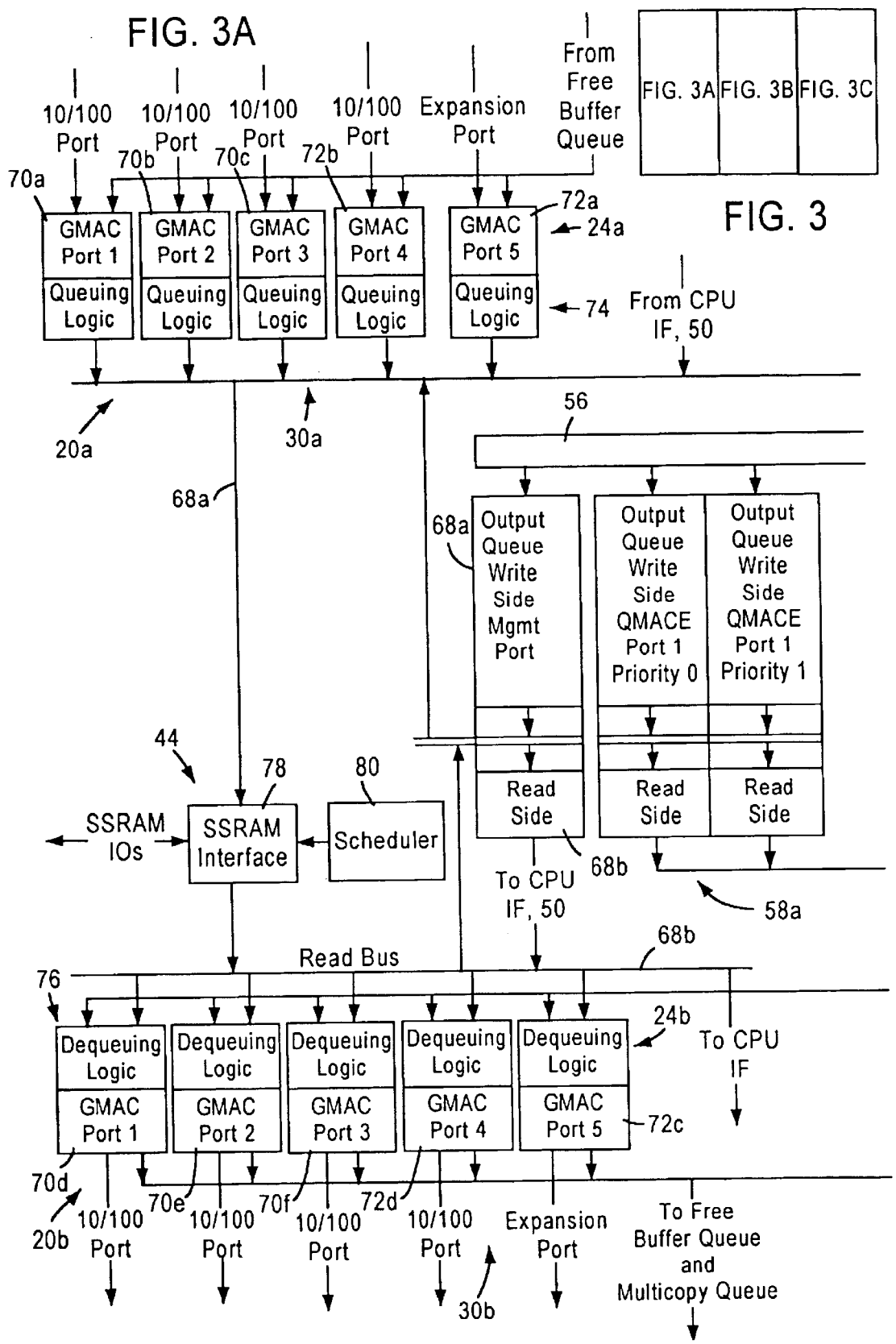

ary of the invention text follows...

APPARATUS AND METHOD IN A NETWORK SWITCH PORT FOR TRANSFERRING DATA BETWEEN BUFFER MEMORY AND TRANSMIT AND RECEIVE STATE MACHINES ACCORDING TO A PRESCRIBED INTERFACE PROTOCOL

BACKGROUND OF THE INVENTION

1. Field of the Invention

The present invention relates to networks and more particularly, to a system and method of controlling network traffic data in a full-duplex switched network operating according to Ethernet (IEEE 802.3) protocol.

2. Description of the Related Art

Switched local area networks use a network switch for supplying data frames between network stations or other network nodes, where each network node is connected to the network switch by a media. The switched local area network architecture uses a media access control (MAC) enabling a network interface within each network node and the network switch to access the media. The network switch stores and forwards data frames received from a transmitter node to a destination node based on header information and the data in the received frames, including source and destination address. An external memory, such as an SSRAM, is used by the network switch to temporarily store the data frames as they are passed through the switch. In particular, the network switch stores and fetches data frames in the external memory via an external memory bus.

Transmission and reception of a data frame in a network switch port typically involves receiving a data packet by a MAC, and transferring the received data packet to a first in first out (FIFO) buffer memory. Conversely, transmit data is stored in a transmit FIFO prior to transmission on the network media by the MAC. One disadvantage with the use of a FIFO for a transmit buffer or a receive buffer is the increased latency encountered during the buffering process. The latency of the network switch port is the time delay between the time that a data frame is supplied to the network switch port and the time the data is transmitted on the network medium interface, or vice versa.

An additional disadvantage with the use of a FIFO or transmit buffer or receive buffer is the increasing complexity associated with maintaining status information for each data frame stored in the FIFO buffer. If a stored data frame is to have corresponding status information, then an additional FIFO buffer would be required for storing the status information for each stored data frame. Moreover, additional synchronization logic would be required to maintain correspondence between the stored frame data and the corresponding status data, increasing the cost and complexity of the network switch.

However, the use of any alternative FIFO buffer may create substantial problems in timing and synchronization within the network switch port. For example, data is received from the network medium according to a network data clock, whereas switched data (i.e., transmit data) is supplied to the network switch port by the network switch according to an internal switch clock. Hence, synchronization issues may cause difficulty in controlling data transfers, as well as avoiding the dropping of data. Hence, the substantial differences in clock speeds between the network switch and network clock rates may cause substantial problems when attempting to transfer data between buffer memories and the MAC.

SUMMARY OF THE INVENTION

There is a need for an arrangement that enables the use of random access buffer memories in a network switch port in a manner that minimizes synchronization issues due to different clock domains.

There is also a need for an arrangement that enables transfer of data between a transmit or receive state machine and a buffer memory in a network switch port according to prescribed interface protocol signals that establish a data transfer protocol independent of different clock domains encountered by the network switch port.

These and other needs are obtained by the present invention where a network switch port includes a transmit state machine and receive state machine for transmitting and receiving network data to and from a medium interface, and a memory management unit configured for selectively transferring the network data between the transmit and receive state machines and respective buffers, based on prescribed interface protocol signals between the memory management unit and the transmit state machine and the receive state machine.

According to one aspect of the present invention, a network switch port in a network switch is configured for sending and receiving data packets between a medium interface and the network switch. The network switch port includes a transmit buffer for storing transmit data from the network switch and a receive buffer for storing receive data to be transferred to the network switch, a transmit state machine and receive state machine for transmitting and receiving the transmit data and receive data onto and from the medium interface according to a prescribed network protocol, respectively, and a memory management unit. The memory management unit is configured for selectively transferring the transmit data and the receive data to and from the transmit state machine and the receive state machine, respectively, based on prescribed interface protocol signals between the memory management unit and the transmit state machine and receive state machine. The selective transfer of transmit data and the receive data by the memory management unit based on prescribed interface protocol signals enables a prescribed interface protocol to be established between the memory management unit and the transmit and receive state machines, enabling data transfers to be performed independent of different clock domains encountered within the network switch port. Hence, the memory management unit and the transmit and receive state machines can transfer data reliably despite the presence of different clock domains, such as a network switch clock domain in the memory management unit, a network transmit clock domain in the transmit state machine, and a network receive clock domain in the receive state machine.

Another aspect of the present invention provides a method in a network switch port of transferring receive data to a network switch from a medium interface. The method includes receiving a data frame carrying receive data in a receive state machine from the medium interface, outputting from a memory management unit a receive buffer availability signal based on a determined availability of memory locations in a random access receive buffer, selectively supplying the receive data from the receive state machine to the random access receive buffer based on the receive buffer availability signal, outputting interface control signals from the receive state machine based on a detected condition of the receive data, and selectively storing the receive data by the memory management unit into the random access receive buffer based on the interface control signals.

Still another aspect of the present invention provides a method in a network switch port of transferring transmit data from a network switch to a medium interface. The method includes storing transmit data received from the network switch in a random access transmit buffer, outputting from a memory management unit a transmit data availability signal based on a determined availability of a prescribed number of bytes of the transmit data in the random access transmit buffer, selectively outputting a transmit buffer advance signal from a transmit state machine based on the transmit buffer availability signal and a determined network condition on the medium interface, supplying the transmit data from the memory management unit to the transmit state machine in response to the transmit buffer advance signal, outputting interface control signals from the transmit state machine based on a detected condition of transmission of the transmit data onto the medium interface, and selectively accessing the random access transmit buffer by the memory management unit based on the interface control signals.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

DETAILED DESCRIPTION OF ILLUSTRATIVE EMBODIMENTS

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
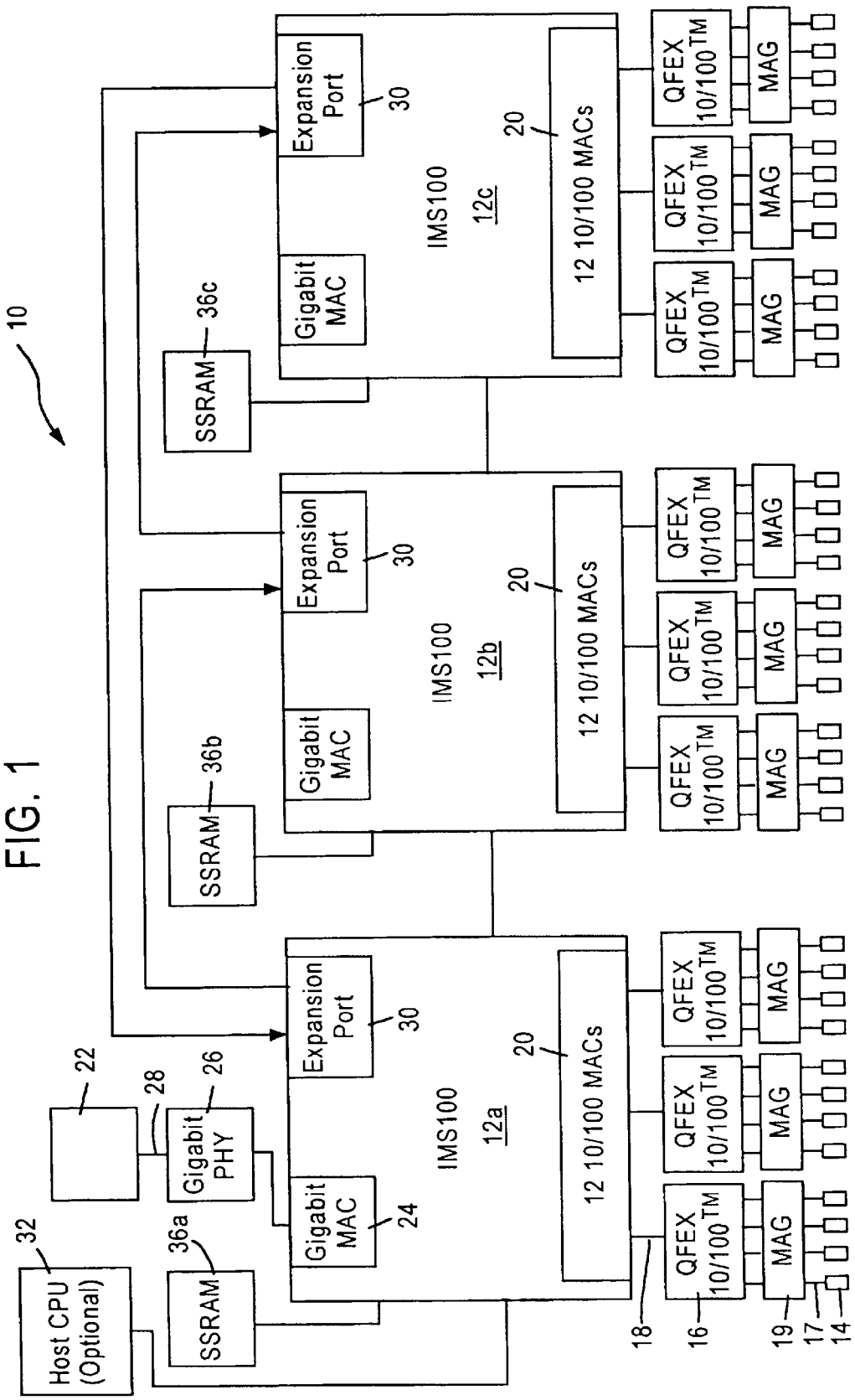
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the switches 12 selectively forward data packets received from the network nodes 14 or 22 to the appropriate destination based upon Ethernet protocol.

Each switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 17. Rather, each half-duplex station 14 includes an Ethernet interface card that uses carrier-sense multiple access with collision detection (CSMA/CD) to listen for traffic on the media. The absence of network traffic is detected by sensing a deassertion of a receive carrier on the media. Any station 14 having data to send will attempt to access the channel by waiting a predetermined time after the deassertion of a receive carrier on the media, known as the interpacket gap interval (IPG). If a plurality of stations 14 have data to send on the network, each of the stations will attempt to transmit in response to the sensed deassertion of the receive carrier on the media and after the IPG interval, resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding switch 12.

Each switch 12 is coupled to 10/100 physical layer (PHY) transceivers 16 configured for sending and receiving data packets to and from the corresponding switch 12 across a corresponding shared media independent interface (MII) 18. In particular, each 10/100 PHY transceiver 16 is configured for sending and receiving data packets between the switch 12 and up to four (4) network stations 14 via the shared MII 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each switch 12 also includes an expansion port 30 for transferring data between other switches according to a prescribed protocol. For example, each expansion port 30 can be implemented as a second gigabit MAC port similar to the port 24, enabling multiple switches 12 to be cascaded together as a separate backbone network.

Figure 2:
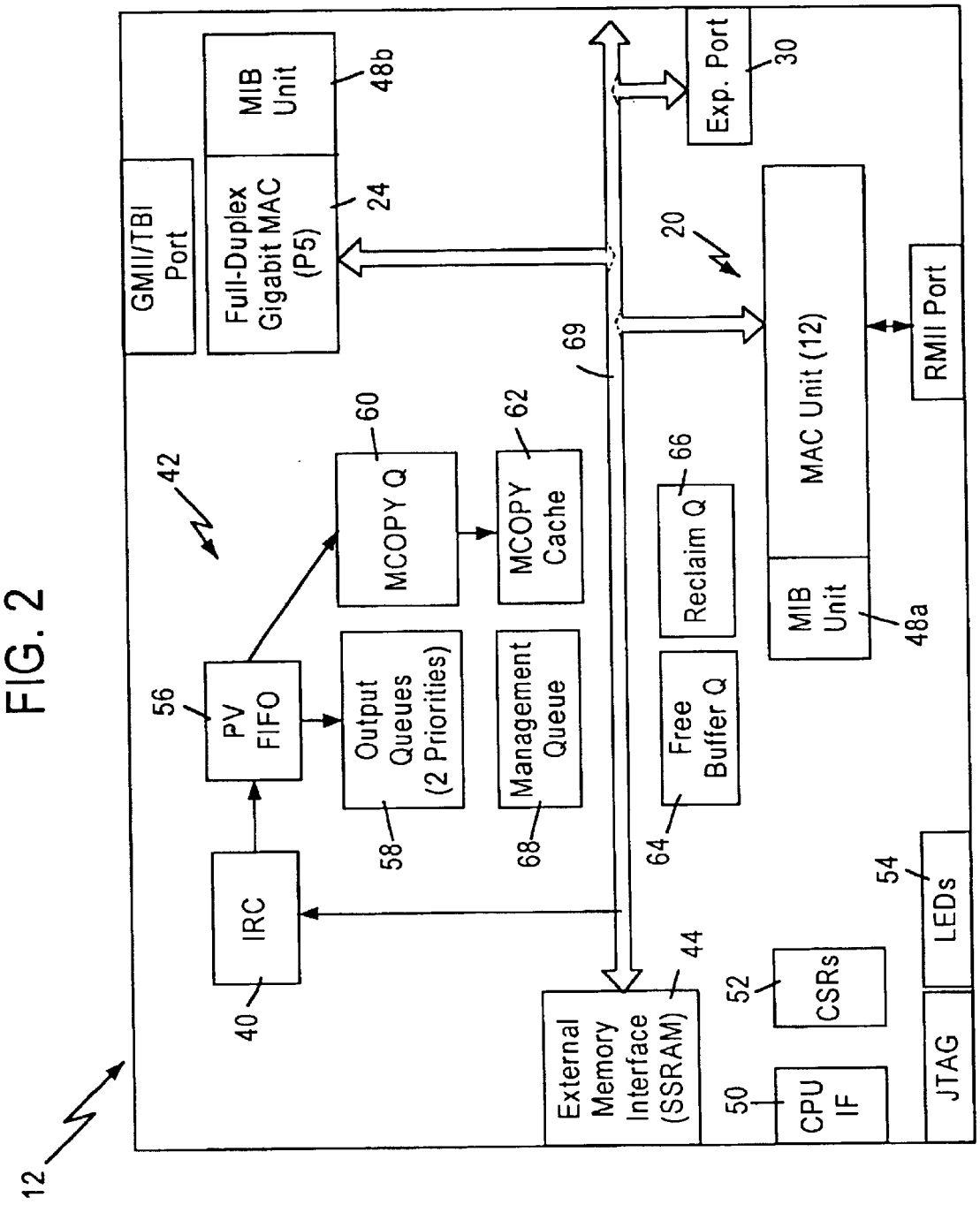
FIG. 2 is a block diagram of the multiple port switch of FIG. 1.

FIG. 2 is a block diagram of the switch 12. The switch 12 contains a decision making engine 40 that performs frame forwarding decisions, a switching subsystem 42 for transferring frame data according to the frame forwarding decisions, a buffer memory interface 44, management information base (MIB) counters 48, and MAC (media access control) protocol interfaces 20 and 24 to support the routing of data packets between the Ethernet (IEEE 802.3) ports serving the network stations 14 and 22. The MIB counters 48 provide statistical network information in the form of management information base (MIB) objects to an external management entity controlled by a host CPU 32, described below.

The external memory interface 44 enables external storage of packet data in a synchronous static random access memory (SSRAM) 36 in order to minimize the chip size of the switch 12. In particular, the switch 12 uses the SSRAM 36 for storage of received frame data, memory structures, and MIB counter information. The memory 36 is preferably a pipelined burst SSRAM having a 64-bit wide data path, a 16-bit wide address path, and a memory size of at least 512 kbytes, capable of running at clock frequencies up to 66 MHz.

The switch 12 also includes a processing interface 50 that enables an external management entity such as a host CPU 32 to control overall operations of the switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received from one source to at least one destination station.

The switch 12 also includes an LED interface 54 that clocks out the status of conditions per port and drives external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the frame pointer value and the associated header information to determine which MAC ports will output the data packet stored at the location specified by the frame pointer. The decision making engine may thus determine that a given data packet should be output by either a single port, multiple ports, or all ports (i.e., broadcast). For example, each data packet includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. Alternatively, the received data packet may include a VLAN (virtual LAN) tagged frame according to IEEE 802.1d protocol that specifies another network (e.g., via a gateway 22) or a prescribed group of stations. The IRC 40 may also determine that the received data packet should be transferred to another switch 12 via the expansion port 30. Hence, the internal rules checker 40 will decide whether a frame temporarily stored in the buffer memory 36 should be output to a single MAC port or multiple MAC ports.

The internal rules checker 40 outputs a forwarding decision to the switch subsystem 42 in the form of a forwarding descriptor. The forwarding descriptor includes a port vector identifying each MAC port that should receive the data packet, priority class identifying whether the frame is high priority or low priority, VLAN information, Rx port number, Opcode, and frame pointer. The port vector identifies the MAC ports to receive the data packet for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data packet transmission. In other words, the port vector FIFO 56 supplies the frame pointer on a per-port basis. The output queues 58 fetch the data packet identified in the port vector from the external memory 36 via the external memory interface 44, and supply the retrieved data packet to the appropriate transmit FIFO of the identified ports. If a data packet is to be supplied to a management agent, the frame pointer is also supplied to a management queue 68, which can be processed by the host CPU 32 via the CPU interface 50.

The multicopy queue 60 and the multicopy cache 62 keep track of the number of copies of the data packet that are fetched from the respective output queues 58, ensuring that the data packet is not overwritten in the SSRAM 36 until the appropriate number of copies of the data packet have been output from the SSRAM 36. Once the number of copies corresponds to the number of ports specified in the port vector FIFO, the port vector is forwarded to the reclaim queue 66. The reclaim queue stores frame pointers that can be reclaimed by the free buffer queue 64 as free pointers. After being returned to the free buffer queue 64, the frame pointer is available for reuse by the MAC unit 20 or the gigabit MAC unit 24.

Figure 3B:
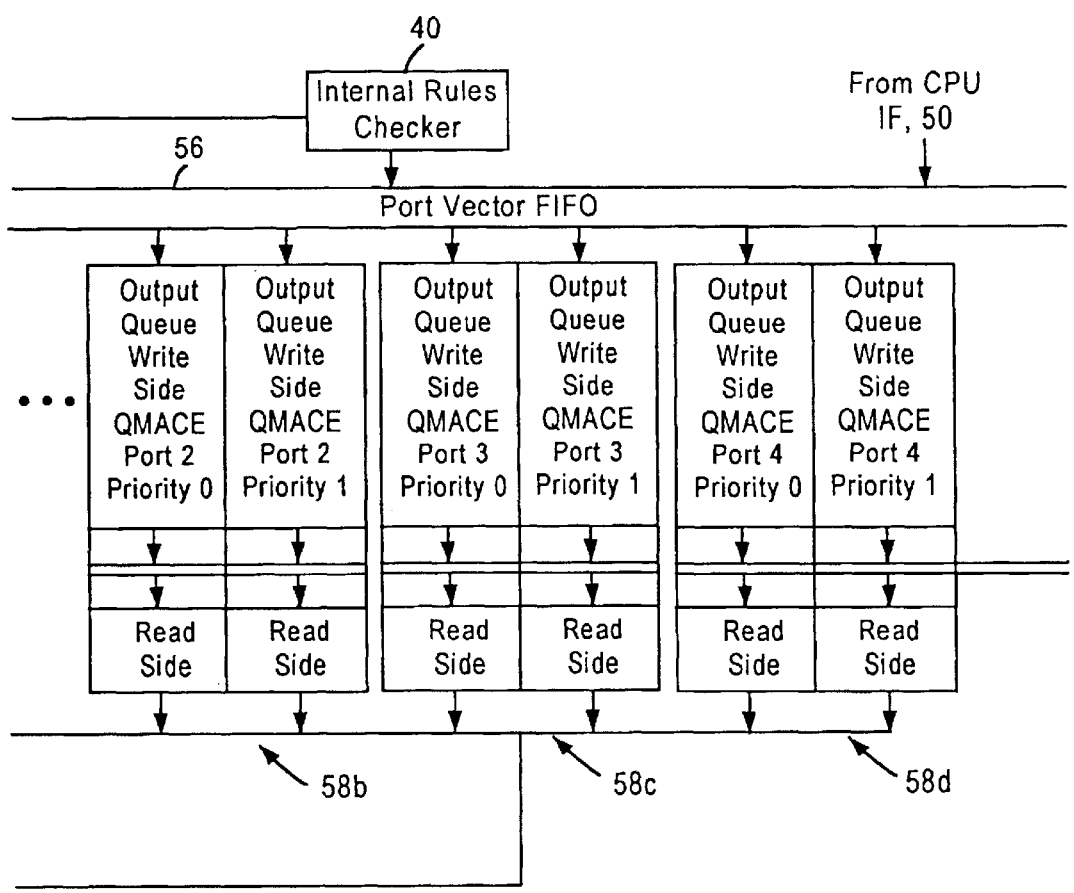
FIG. 3 is a block diagram illustrating in detail the switching subsystem of FIG. 2.
Figure 3C:
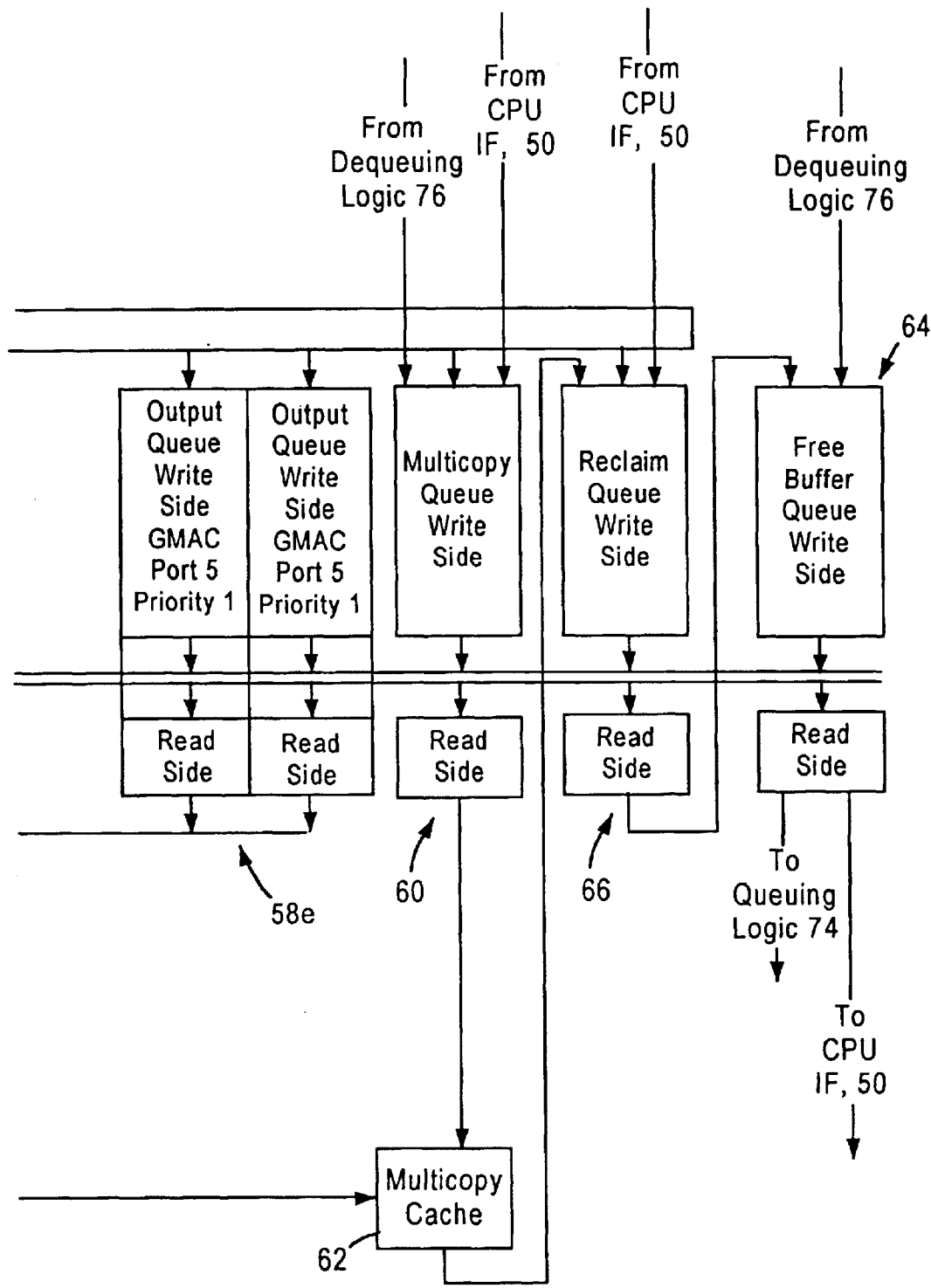

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 20b. The receive portion 20a and the transmit portion 20b each include three (3) quad-MAC enhanced (QMACE) modules 70 configured for performing the corresponding receive or transmit function for four (4) switch ports according to IEEE 802.3 protocol. Hence, QMACE module 70a performs receive MAC operations for 10/100 Mb/s switch ports 0, 1, 2, 3; module 70b performs receive MAC operations for 10/100 Mb/s switch ports 4, 5, 6, 7; and module 70c performs receive MAC operations for 10/100 Mb/s switch ports 8, 9, 10, and 11. The QMACE modules 70d, 70e, and 70f perform the transmit MAC operations for the 10/100 Mb/s switch ports complementary to modules 70a, 70b, and 70c, respectively.

The receive portions 24a and 30a of the gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 70c, 72a, and 72b include queuing logic 74 for transferring of receive data from the corresponding internal receive FIFO to the external memory 36 and the rules checker 40. Each of the transmit MAC modules 70d, 70e, 70f, 72c, and 72d include dequeuing logic 76 for transferring data from the external memory 36 to the corresponding internal transmit FIFO. The queuing logic 74 fetches frame pointers from the free buffer queue 64, and uses the fetched frame pointers to store receive data to the external memory 36 via the external memory interface controller 44. The frame buffer pointer specifies the location in external memory 36 where the received data frame will be stored by the receive FIFO. The queuing logic 74 issues a write request to the external memory interface 44.

The external memory interface 44 includes a scheduler 80 for controlling memory access by the queuing logic 74 or dequeuing logic 76 by any switch port to the external memory 36, and an SSRAM interface 78 for performing the read and write operations with the SSRAM 36. In particular, the switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC 24a stores a data frame in an internal FIFO upon reception from the corresponding switch port. The corresponding queuing logic 74 obtains a frame pointer and sends a write request to the external memory interface 44. The scheduler 80 schedules the write request with other write requests or any read requests from the dequeuing logic 76, and generates a grant for the requesting queuing logic 74 to initiate a transfer at the scheduled event (i.e., slot). The frame data is then transferred over data bus 68a from the receive FIFO to the external memory 36 in a direct memory access (DMA) transaction during the assigned slot. The frame is stored in the location pointed to by the free buffer pointer obtained from the free buffer pool 64, although a number of other buffers may be used to store a frame, as will be described.

The rules checker 40 also receives the frame pointer and the header information (including source address, destination address, VLAN tag information, etc.) by monitoring (i.e., snooping) the DMA write transfer on the bus 68a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue, e.g. at least one of the queues 58 or the management queue 68, should receive the associated frame pointer. The port vector FIFO 56 places the frame pointer into the top of the appropriate queue 58 and/or 68. This queues the transmission of the frame. The output queue 58 is processed separately by the host CPU 32 via the CPU interface 50.

As shown in FIG. 3, each of the transmit MAC units 70d, 70e, 70f, 72d, and 72c have an associated output queue 58a, 58b, 58c, 58d, and 58e, respectively. Each of the output queues 58 have a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example the output queue 58e for the gigabit transmit MAC 72c. The dequeuing logic 76 for the transmit gigabit port 24b takes the frame pointer from the corresponding gigabit port output queue 58e, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initaite a DMA read during the assigned slot. In response to the grant, the dequeuing logic 76 reads the frame data in a DMA transaction from the location in external memory 36 pointed to by the frame pointer, stores the frame data in the internal transmit FIFO for transmission by the transmit gigabit MAC 72c. If the frame pointer specifies a unicopy transmission, the frame pointer is returned to the free buffer queue 64 following writing the frame data into the transmit FIFO.

A multicopy transmission is similar to the unicopy transmission, except that the port vector has multiple bits set, designating the multiple ports from which the frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the frame has been transmitted to its designated output port(s). In particular, the dequeuing logic passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO also copies the frame pointer and the copy count to the multicopy queue 60. The multicopy queue writes the copy count to the multicopy cache 62. The multicopy cache is a random access memory having a single copy count for each buffer in external memory (i.e., each frame pointer).

Once the dequeuing logic 76 retrieves the frame data for a particular output port based on a fetched frame pointer and stores the frame data in the transmit FIFO, the dequeuing logic checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list chain of frame pointers to identify the entire stored data frame. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the network switch 12 will now be provided.

Data Transfer Across MAC-MMU Interface

Figure 4:
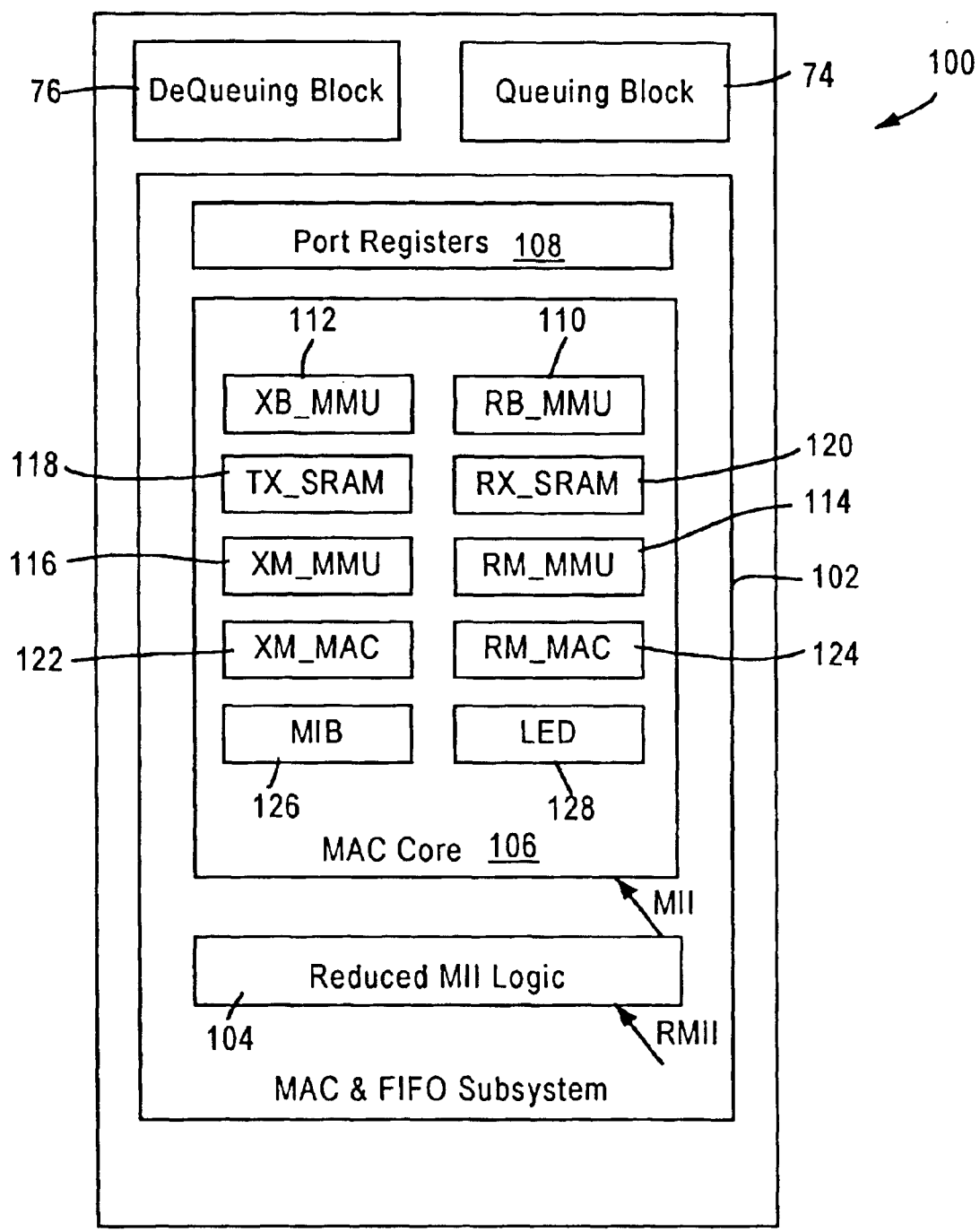
FIG. 4 is a block diagram illustrating one of the network switch ports of FIG. 3 according to an embodiment of the present invention.

FIG. 4 is a block diagram illustrating a network switch port 100 in the switch 12 configured for sending and receiving data packets between the switching subsystem 42 and the reduced media independent interface 18 according to an embodiment of the present invention. As described above, each MAC module 70 includes a 10/100 Mb/s switch ports 100. However, the architecture of the network switch port 100 is also applicable to the gigabit MAC port 24 and the expansion port 30.

As shown in FIG. 4, the network switch port 100 includes the queuing block 74 and the dequeuing block 76, described above. The queuing block 74 is configured for transferring data packets received by the network switch port 100 to the external memory 36, and the dequeuing block 76 is configured for transferring transmit data from the external memory 36 for transmission by the network switch port 100.

The network switch port 100 also includes a MAC and FIFO subsystem 102 configured for transmitting and receiving data packets between the switching subsystem 42 and the reduced MII 18. In particular, the MAC and FIFO subsystem 102 includes reduced MII logic 104, a MAC core 106, and port registers 108. The reduced MII (RMII) logic 104 is configured for translating between a reduced MII protocol and the MII protocol by converting nibble-wide (4-bit) data on the MII interface to 2-bit wide data on the RMII 18, reducing the number of pins necessary for data transfer. The port registers 108 are configured for storing status and control configuration information for the switch port 100.

The MAC core 106 performs the basic operations of sending and receiving data packets according to IEEE 802.3 protocol, storing the transmit and receive data in transmit and receive buffers, and transferring the transmit and receive data into and out of the buffers. In particular, the MAC core 106 includes a memory management architecture that enables transfer of transmit data and receive data across multiple independent clock domains. The MAC core 106 includes a receive bus-side memory management unit (RB_MMU) 110, a transmit bus-side memory management unit (XB_MMU) 112, a receive MAC-side memory management unit (RM_MMU) 114, and a transmit MAC-side memory management unit (XM_MMU) 116. As described below, the RB_MMU 110, the (XB_MMU) 112, (RM_MMU) 114 and (XM_MMU) 116 form a memory management system configured for controlling transfer of data to and from the transmit random access buffer memory (TX_SRAM) 118 and the receive random access buffer memory (RX_SRAM) 120. The MAC core 106 also includes a transmit state machine (XM_MAC) 122 and a receive state machine (RM_MAC) 124 configured for sending and receiving data packets according to IEEE 802.3 protocol, respectively.

The memory management unit architecture enables data packets to be transferred between the random access transmit buffer 118, and the random access receive buffer 120, across multiple clock domains without concern of synchronization issues between the clock domains. In particular, the XB_MMU 112 is configured for transferring data from the read bus 68b of FIG. 3 into the random access transmit buffer 118 under the control of the dequeuing block 76 and according to the clock domain of the read bus 68b. Similarly, the RB_MMU 110 transfers receive data from the random access receive buffer 120 onto the write bus 68a under the control of the queuing block 74 and according to the clock domain of the write bus 68a. Hence, the XB_MMU 112 and the RB_MMU 110 control transfer of data between the transmit buffer 118 and the receive buffer 120 according to the clock domains of the read bus 68b and the write bus 68a, respectively.

The XM_MMU 116 is configured for transferring transmit data stored in the TX_SRAM 118 to the transmit MAC state machine 122 according to a prescribed interface protocol between the XM_MMU 116 and the XM_MAC 122, described below. Similarly, the RM_MMU 114 is configured for transferring receive data from the RM_MAC 124 to the RX_SRAM 120 according to a prescribed interface protocol between the RM_MAC 124 and the RM_MMU 114. As described below, the interface protocol between the memory management units and the transmit or receive state machines establishes a request/acknowledge based protocol, enabling the memory management units to transfer data to and from the respective random access buffer memories without creating synchronization issues with the transmit clock domain of the transmit state machine 122 or the receive clock of the receive state machine 124.

Figure 5:
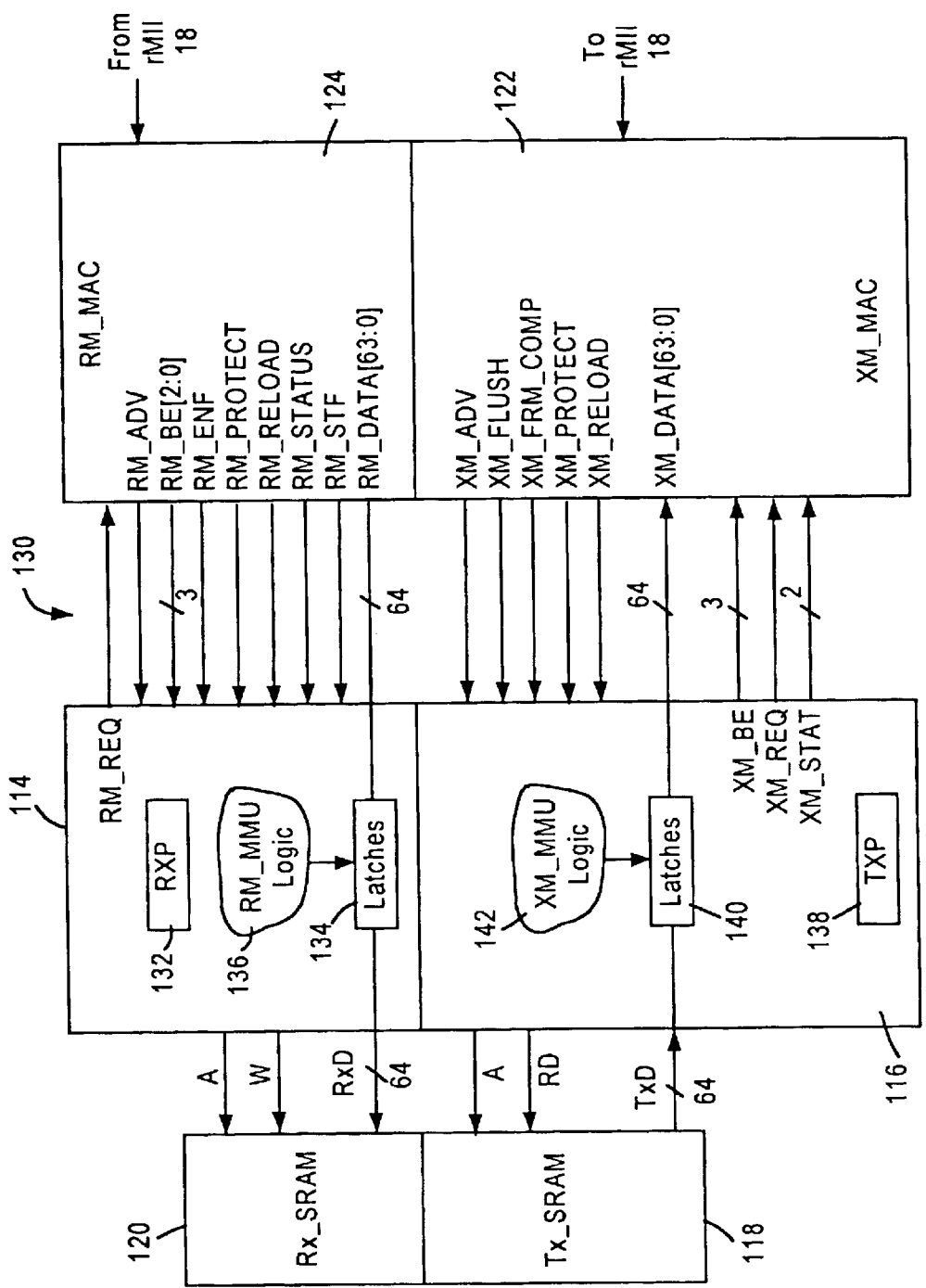
FIG. 5 is a block diagram illustrating in detail the interface between the memory management unit and the transmit and receive state machines of FIG. 4 according to an embodiment of the present invention.

FIG. 5 is a diagram illustrating in detail the interface 130 between the memory management units 114 and 116, and the transmit and receive state machines 122 and 124 according to an embodiment of the present invention. As shown in FIG. 5, the interface 130 includes plurality of interface protocol signals that are exchanged between the RM_MMU 114 and the RM_MAC 124, and between the XM_MMU 116 and the XM_MAC 122. These interface protocol signals establish a hand shaking protocol between the memory management units and the state machines to control transfer of data to the respective random access buffer memory while avoiding synchronization problems that normally may be encountered due to different clock domains.

As shown in FIG. 5, the RM_MMU 114 is configured for outputting a receive buffer availability signal RM_REQ to the receive state machine 124. The receive memory management unit 114 outputs the receive buffer availability signal (RM_REQ) based on a determined availability of memory locations in the receive buffer 120, for example a minimum of 64 bytes. The receive buffer state machine 124, in response to receiving the receive buffer availability signal (RM_REQ), can begin to transfer receive data that is received in the form of data packets from the reduced MII 18. The receive state machine 124 transfers the receive data on a 64-bit wide receive MAC data path (RM_DATA), along with additional signals specifying whether the supplied data should be stored in a new memory location, overwritten over a previous location, or whether the data on the RM_DATA path corresponds to status data.

The receive memory management 124 initiates transfer of receive data by concurrently outputting a start of frame signal (RM_STF) and a receive buffer advance signal pulse (RM_ADV). The receive buffer advance signal pulse (RM_ADV) is asserted during one clock cycle in the receive MAC clock domain, and is used to advance a receive SRAM write pointer (RXP) stored in a register 132 in the RM_MMU 114. The receive memory management unit 114, in response to detecting the receive buffer advance signal pulse (RM_ADV), increments the write pointer (RXP) on the following clock cycle in the receive MAC clock domain.

The receive buffer advance signal pulse (RM_ADV) is typically asserted by the receive state machine 124 every 16 clock cycles in the receive MAC clock domain (RMCLK), resulting in a transfer of 8 bytes of receive data for each receive buffer advance signal pulse.

The interface 130 also includes a 3-bit receive MAC byte enable (RM_BE) representing a byte alignment value that indicates a number of valid bytes of the receive data on the receive data path (RM_DATA). The byte alignment value is encoded, such that the value "000" corresponds to 8 bytes of valid data, and "001" corresponds to only a single byte of valid data. Hence, the receive state machine 124 outputs the byte alignment value (RM_BE) for each transfer on the receive data path (RM_DATA).

The interface 130 also includes a receive buffer protect signal (RM_PROTECT), an end of frame signal (RM_ENF), a receive buffer pointer reload signal (RM_RELOAD), and a status signal (RM_STATUS) indicating data transfer to the receive memory management unit 114 corresponds to status data for a received data frame. The receive buffer protect signal (RM_PROTECT) is asserted by the receive state machine 124 when the receive byte count is less than 64. Hence, the receive state machine 124 deasserts the receive buffer protect signal in response to transferring the predetermined minimum number of bytes of the receive data (e.g., 64 bytes). Hence, the receive memory management unit, in response to deassertion of the receive buffer protect signal (RM_PROTECT), transfers the receive data from internal latches 134 to the random access receive buffer 120.

The receive buffer pointer reload signal (RM_RELOAD) is asserted by the receive state machine 124 based on a detected invalid condition in the receive data, for example due to a detected collision in a half duplex network, or due to an error signal (RXER) received from RMII 18. The receive memory management unit 114, in response to detecting the receive buffer pointer reload signal, reloads the receive memory pointer 132 with a stored pointer value (StoredP) corresponding a beginning of the data frame, enabling the erroneous data stored in the RX_SRAM to be overwritten. The receive state machine 124 outputs the end of frame signal (RM_ENF) in response to transfer of the receive data as a complete data frame. The end of frame signal is valid when concurrently asserted with the receive buffer advanced signal pulse (RM_ADV), and the end of frame signal is written into the receive SRAM 120 with the current receive data on the following clock of the receive MAC clock domain. A value of "1" written into the RX_SRAM 120 indicates that the RM_DATA is the last 8 bytes of the frame. The status signal (RM_STATUS) output by the receive state machine 124 indicates that the current data on the RM_DATA path is receive tag/status information. The status signal is asserted by the receive state machine 124 upon the deassertion of the end of frame signal (RM_ENF), and deasserts after 2 receive MAC clock cycles.

As shown in FIG. 5, the receive memory management unit 114 includes logic 136 for controlling the transfer of receive data on the RM_DATA path from the latches 134 to the random access receive buffer memory 120, and for incrementing and reloading the receive buffer pointer 132 that points to a corresponding location in the buffer memory 120 for writing receive data or corresponding status data. Hence, the receive memory management unit 114 selectively transfers the receive data and selectively stores the receive data into the random access receive buffer based on the interface control signals output by the receive state machine 124.

The interface 130 includes similar interface control signals for the transmit data supplied from the random access transmit buffer 118 to the transmit state machine 122 under the control of the transmit memory management unit 116. As shown in FIG. 5, the transmit memory management unit 116 includes a register 138 for storing a transmit buffer pointer value (TXP), latches 140 for temporarily storing the 64-bit wide data transferred from the random access transmit buffer 118 and output onto a 64-bit data path (XM_DATA), and logic 142 for selectively controlling the transmit buffer pointer (TXP) stored in register 138 and the transfer of data from the transmit SRAM 118.

As shown in FIG. 5, the transmit memory management unit 116 outputs a 64-bit wide transmit data signal, and encoded byte enable signal (XM_BE) that specifies a transmit byte alignment value indicating a number of valid bytes of the transmit data on the transmit data path (XM_DATA). The transmit memory management unit 116 also outputs a transmit request signal (XM_REQ) based on a determined minimum number of bytes (e.g., 64 bytes corresponding a minimum size data frame) stored in the random access transmit buffer 118. The transmit memory management unit 116 also outputs a 2-bit transmit status signal (XM_STAT), where the first bit is asserted to indicate a start of packet, and then deasserted to indicate the end of a packet. The second bit of the status where (XM_STAT) is used to specify to the transmit state machine 122 whether the transmit state machine 122 should append an error correction code, for example a frame check sequence (FCS).

The transmit state machine 122, in response to detecting the transmit request signal (XM_REQ), determines the status of the network condition on the medium interface (RMII) 18, for example whether the network media is idle in a half-duplex medium, or whether the link is active in a full duplex network. Based on the determined network condition on the medium interface 104, the transmit state machine 122 outputs a transmit buffer advance signal pulse (XM_ADV) according to the transmit MAC clock domain (XM_CLK). As described above with respect to the receiver buffer advance signal pulse (RM_ADV), the transmit buffer advance signal pulse (XM_ADV) is used to advance the transmit buffer pointer (TXP) in the register 138 by the logic 142. The transmit buffer advance signal pulse (XM_ADV) is typically asserted once every 16 clock cycles in the transmit clock domain (XM_CLK), resulting in a transfer of 8 bytes of transmit data for each transfer buffer advance signal pulse.

The transmit state machine 122 asserts a transmit buffer protect signal (XM_PROTECT) at the beginning of the frame, and is deasserted at either the end of the frame or the middle of the frame to signal the transmit memory management unit 116 that the corresponding memory locations in the transmit buffer 116 may be released to the XB_MMU 112 of FIG. 4. Hence, the transmit state machine 122 deasserts the transmit buffer protect signal (XM_PROTECT) in response to transmitting a prescribed minimum number of bytes of the transmit data onto the medium interface, for example a minimum number of data bytes that indicates to the transmit state machine 122 that the data packet can be successfully transmitted. The transmit state machine 122 also outputs a transmit buffer pointer reload signal (XM_RELOAD) for retransmission of the prescribed number of bytes. The logic 142, in response to detecting the transmit buffer pointer reload signal, reloads the register 138 with a stored transmit pointer corresponding to the beginning of the data frame, and initiates a second transfer of the transmit data from the transmit buffer 118.

The transmit state machine 122 also outputs a completion signal (XM_FRM_COMP) based on a successful transmission of the transmit data as the data frame. Alternatively, the flush signal (XM_FLUSH_COMP) may indicate a decision by the transmit state machine 122 to "flush" the frame. If the logic 142 determines that the completion signal is asserted before transfer of the end of the frame from the transmit memory buffer 118, the logic 142 jumps to the beginning of the next frame based on status information for the flushed frame, and updates the transmit buffer pointer value to the next frame of transmit data.

Figure 6:
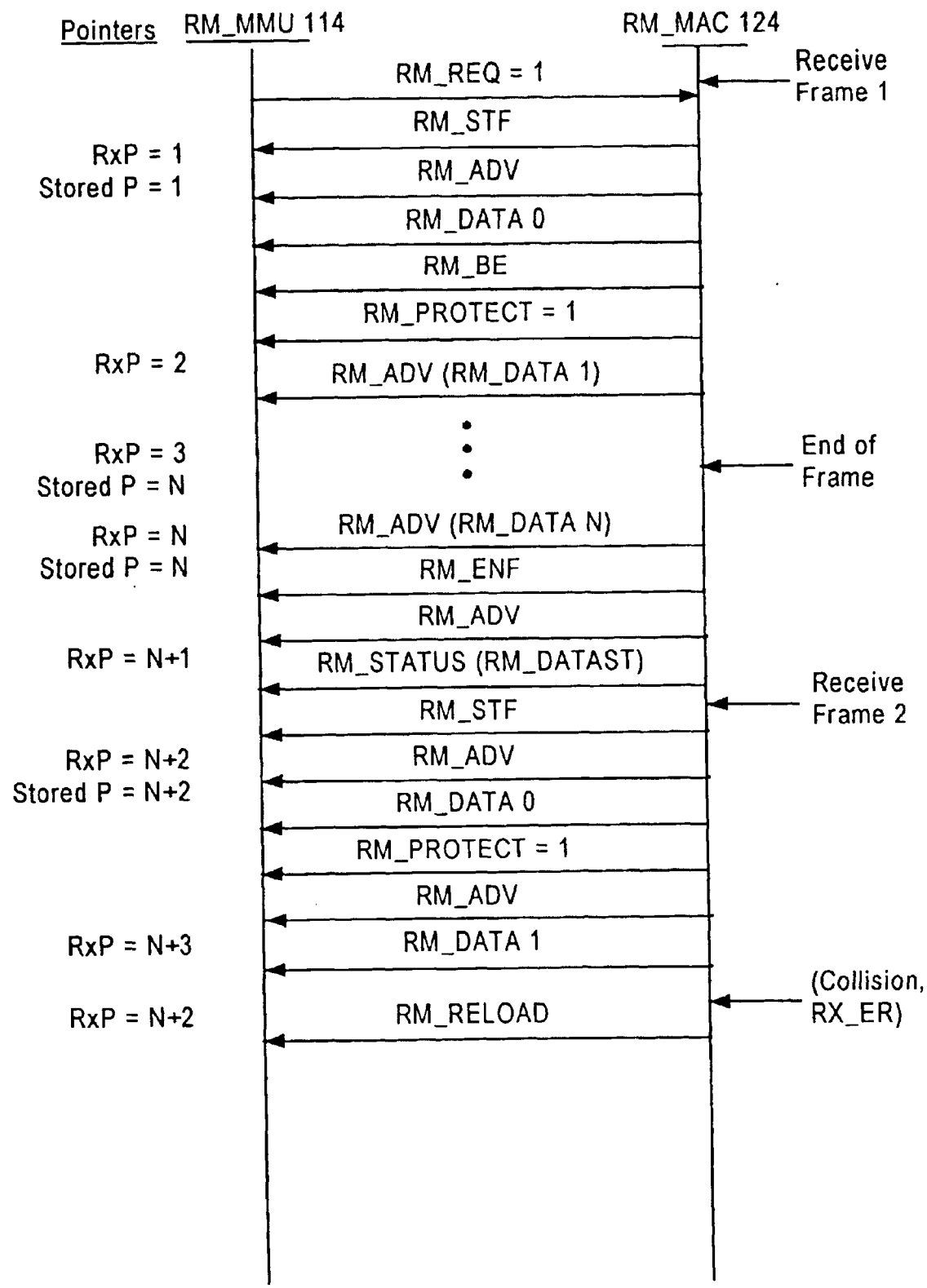
FIG. 6 is a sequence diagram summarizing the transfer of receive data from the receive state machine to the receive memory management unit of FIG. 5.

FIG. 6 is a sequence diagram illustrating the interface protocol signals between the receive memory management unit 114 and the receive state machine 124. As shown in FIG. 6, the receive state machine 124 receives a data packet from RMII 18, and checks whether space is available in the receive buffer memory 120 by determining the presence of a receive buffer availability signal (RM_REQ) from the RM_MMU 114. In response to detecting the receive buffer availability signal, the receive state machine 124 concurrently outputs a start of frame signal (RM_STF) and a receive buffer advance signal pulse (RM_ADV), and begins to transfer the first 8-bytes of received data (RM_DATA_ZERO) as 8-bit (8-byte) transfers during 16 clock cycles. The receive MAC 124 also outputs the encoded byte alignment value (RM_BE) indicating the number of valid bytes on the receive data path. The receive state machine 124 also asserts the receive buffer protect signal (RM_PROTECT= 1) during the first data transfer, since the receive byte count is less than 64. RM_PROTECT will de-assert when receive byte count is 64.

Once the receive state machine 124 detects an end of frame, the receive state machine outputs the end of frame signal (RM_ENF) concurrent with the transfer of the last receive data (e.g., RM_DATAN) on the receive data path. The receive state machine 124 then generates status information related to the status of the received data frame, and asserts the status signal (RM_STATUS) concurrent with transfer of the status data on the RM_DATA path. Hence, the RM_MMU logic 136 can identify the transferred data as status data corresponding to the previously-transferred receive data.

FIG. 6 also illustrates reception of a second data frame, where the transfer of the receive data begins by storing the frame pointer (N+2) into a stored location (StoredP). During reception of the data frame, the receive state machine 124 detects a condition on the media interface, for example, a collision or a receive error signal, indicating that reception of the receive data should be aborted. The receive state machine 124 in response asserts the receive buffer pointer reload signal (RM_RELOAD) based on the detected invalid condition and the receive data. The receive memory management unit 114 in response reloads the initial receive buffer pointer value stored in the storage register (StoredP= N+2), and reloads the initial receive pointer value into the pointer register 132.

Hence, the memory management units and the transmit/ receive state machines generate interface protocol signals 130 that establish a prescribed interface protocol between the memory management unit and the receive state machine for transfer of received data. As readily apparent from above, operation of the transmit interface protocol signals operate in a similar manner to the receive side, except that the transmit memory management unit 116 generates the byte enable (XM_BE) signal and the status signals (XM_STAT) indicating start of frame and end of frame and whether a frame check sequence should be appended. All other signals generated by the transmit state machine 122 are otherwise generated in a similar manner as described above with respect to the signals generated by the receive state machine 124.

According to the disclosed embodiment, a memory management unit selectively transmits data and receive data to and from a transmit state machine and receive state machine based on prescribed interface protocols signals between the memory management unit and the transmit state machine, and between the memory management unit and the receive state machine. Hence, data transfers can be performed using a relatively simple implementation without the concern of synchronization issues normally encountered to the multiple clock domains encountered by the network switch port.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A network switch port in a network switch and configured for sending and receiving data packets between a medium interface and the network switch, the network switch port comprising:

a transmit buffer for storing transmit data from the network switch and a receive buffer for storing receive data to be transferred to the network switch;

a transmit state machine and receive state machine for transmitting and receiving the transmit data and receive data onto and from the medium interface according to a prescribed network protocol, respectively; and a memory management unit configured for selectively transferring the transmit data and the receive data to and from the transmit state machine and the receive state machine, respectively, based on prescribed interface protocol signals between the memory management unit and the transmit state machine and receive state machine.

2. The network switch port of claim 1, wherein the memory management unit includes a receive memory management unit configured for outputting a receive buffer availability signal to the receive state machine based on a determined availability of memory locations in the receive buffer, the receive state machine initiating transfer of the receive data to the receive memory management unit in response to the receive buffer availability signal.

3. The network switch port of claim 2, wherein the receive state machine initiates the transfer of the receive data by concurrently outputting a start of frame signal and a receive buffer advance signal pulse, the receive memory management unit incrementing an initial receive buffer pointer value, corresponding to a location in the receive buffer, to an incremented receive buffer pointer value in response to the receive buffer advance signal pulse.

4. The network switch port of claim 3, wherein the receive state machine outputs the receive buffer advance signal pulse in response to transferring a prescribed number of bytes of the receive data, the receive memory management unit in response incrementing the incremented receive buffer pointer value.

5. The network switch port of claim 3, wherein the receive state machine deasserts a receive buffer protect signal in response to transferring a predetermined minimum number of bytes of the receive data, the receive memory management unit in response storing the received data transferred from the receive state machine into the receive buffer.

6. The network switch port of claim 3, wherein the receive state machine outputs a receive buffer pointer reload signal based on a detected invalid condition in the receive data, the receive memory management unit in response reloading the initial receive buffer pointer value for overwriting the receive data stored in the corresponding location in the receive buffer.

7. The network switch port of claim 3, wherein the receive state machine outputs an end of frame signal in response to transfer of the receive data as a complete data frame.

8. The network switch port of claim 7, wherein the receive state machine outputs a status signal indicating data transferred to the receive memory management unit corresponds to status data for the receive data, the receive memory management unit selectively storing the status data, contiguous with the receive data in the receive buffer, in response to the end of frame signal and based on one of the start of frame signal and the end of frame signal.

9. The network switch port of claim 2, further comprising a receive data path having a prescribed number of bytes for transfer of the receive data from the receive state machine to the receive buffer, the receive state machine outputting a byte alignment value to the receive memory management unit indicating a number of valid bytes of the receive data on the receive data path.

10. The network switch port of claim 1, wherein the memory management unit includes a transmit memory management unit configured for outputting a transmit request signal to the transmit state machine based on a determined minimum number of bytes of the transmit data stored in the transmit buffer, the transmit state machine selectively outputting a transmit buffer advance signal pulse for transfer of the transmit data in response to the transmit request signal and based on a determined network condition on the medium interface.

11. The network switch port of claim 10, wherein the transmit memory management unit increments an initial transmit buffer pointer value, corresponding to a location in the transmit buffer, to an incremented transmit buffer pointer value in response to the transmit buffer advance signal pulse, the transmit memory management unit transferring a prescribed number of bytes of the transmit data in response to incrementing the initial transmit buffer pointer value.

12. The network switch port of claim 11, wherein the transmit state machine outputs the transmit buffer advance signal in response to transmitting the prescribed number of bytes onto the medium interface, the transmit memory management unit in response incrementing the incremented transmit buffer pointer value.

13. The network switch port of claim 12, wherein the transmit state machine deasserts a transmit buffer protect signal in response to transmitting a prescribed minimum number of bytes of the transmit data onto the medium interface, the transmit memory management unit in response releasing the storage locations corresponding to the initial transmit buffer pointer value up to the incremented transmit buffer pointer value for new transmit data from the network switch.

14. The network switch port of claim 12, wherein the transmit state machine outputs a transmit buffer pointer reload signal for retransmission of the prescribed number of bytes, the transmit memory management unit in response reloading the initial transmit buffer pointer value for a second transfer of the prescribed number of bytes of the transmit data to the transmit state machine.

15. The network switch port of claim 12, wherein the transmit memory management unit supplies status information to the transmit state machine corresponding to the transfer of the transmit data to the transmit state machine, the status information including at least one of a start of packet indication identifying a start of a data packet to be transmitted by the transmit state machine, and an error correction request, the transmit state machine generating a frame check sequence for the transmit data in response to the error correction request.

16. The network switch port of claim 12, wherein the transmit state machine outputs a memory flush signal to the transmit memory management unit in response to a detected error in the transmit data, the transmit memory management unit in response resetting the incremented transmit buffer pointer value to a reset transmit buffer pointer value corresponding to a new data packet stored in the transmit buffer.

17. The network switch port of claim 12, wherein the transmit state machine outputs a completion signal to the transmit memory management unit based on one of a successful transmission of the transmit data as a data frame and discarding of the transmit data, the transmit memory management unit in response resetting the incremented transmit buffer pointer value to a reset transmit buffer pointer value corresponding to a new data packet stored in the transmit buffer.

18. The network switch port of claim 12, further comprising a transmit data path having a prescribed number of bytes for transfer of the transmit data from the transmit buffer to the transmit state machine, the transmit memory management unit outputting a transmit byte alignment value to the transmit state machine indicating a number of valid bytes of the transmit data on the transmit data path.

19. The network switch port of claim 1, wherein the transmit buffer and the receive buffer each are randomly-accessible buffer memories.

20. A method in a network switch port of transferring receive data to a network switch from a medium interface, the method comprising:

receiving a data frame carrying receive data in a receive state machine from the medium interface;

outputting from a memory management unit a receive buffer availability signal based on a determined availability of memory locations in a random access receive buffer;

selectively supplying the receive data from the receive state machine to the random access receive buffer based on the receive buffer availability signal;

outputting interface control signals from the receive state machine based on a detected condition of the receive data; and selectively storing the receive data by the memory management unit into the random access receive buffer based on the interface control signals.

21. The method of claim 20, wherein the selectively storing step includes:

storing the receive data in the random access receive buffer in response to deassertion of a receive buffer protect signal generated by the receive state machine based on transferring a predetermined minimum number of bytes of the receive data; and resetting a receive buffer pointer, specifying a corresponding location in the random access receive buffer, in response to a reload signal from the receive state machine.

22. A method in a network switch port of transferring transmit data from a network switch to a medium interface, the method comprising:

storing transmit data received from the network switch in a random access transmit buffer;

outputting from a memory management unit a transmit data availability signal based on a determined availability of a prescribed number of bytes of the transmit data in the random access transmit buffer;

selectively outputting a transmit buffer advance signal from a transmit state machine based on the transmit buffer availability signal and a determined network condition on the medium interface;

supplying the transmit data from the memory management unit to the transmit state machine in response to the transmit buffer advance signal;

outputting interface control signals from the transmit state machine based on a detected condition of transmission of the transmit data onto the medium interface; and selectively accessing the random access transmit buffer by the memory management unit based on the interface control signals.

23. The method of claim 22, wherein the selectively accessing step comprises:

releasing memory locations of the random access transmit buffer having stored the transmit data for additional transmit data from the network switch in response to a first interface control signal; and resupplying the transmit data by the memory management unit from the memory locations to the transmit state machine in response to a second interface control signal.

* * * * *